JAMES D. BREWER.
Improvement in Chute and Fishway.
No. 126,257.
Patented April 30, 1872.
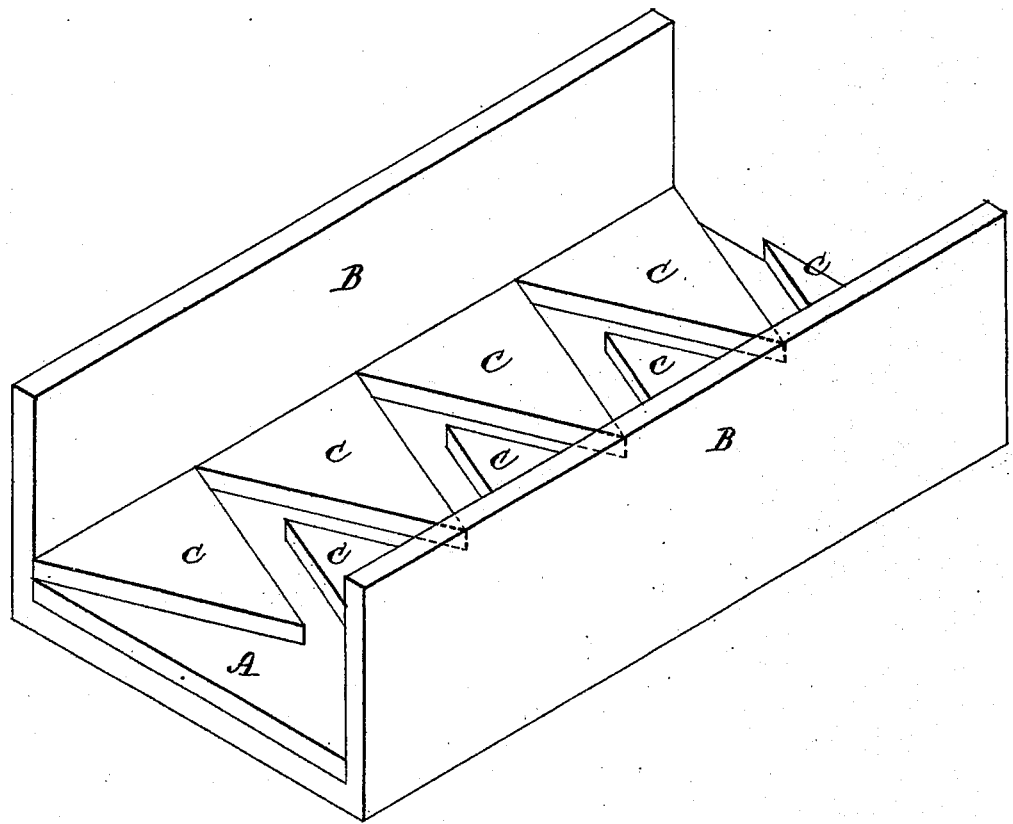

126,257

UNITED STATES PATENT OFFICE.

JAMES D. BREWER, OF MUNCY, PENNSYLVANIA.

IMPROVEMENT IN CHUTES AND FISH-WAYS.

Specification forming part of Letters Patent No. 126,257, dated April 30, 1872.

SPECIFICATION.

*To all whom it may concern:*

Be it known that I, JAMES D. BREWER, of Muncy, in the county of Lycoming and State of Pennsylvania, have invented certain new and useful Improvements in Chutes for the Passage of Fish; and I do hereby declare that the following is a full, clear, and exact description thereof, reference being had to the accompanying drawing and to the letters of reference marked thereon which form a part of this specification.

The nature of my invention consists in a series of isosceles or equilateral triangles extending from the opposite side walls of the chute of a dam, and laid in the bottom thereof so as to form a zigzag course, and leaving an open space for the passage of fish up and down said chute.

In order to enable others skilled in the art to which my invention appertains to make and use the same, I will now proceed to describe its construction and operation, referring to the annexed drawing, in which is represented a perspective of my chute.

A represents the bottom, and B B the side walls of the chute of a dam. On the bottom A, and extending from the side walls B B, are laid a series of isosceles or equilateral triangles, C C, forming a zigzag course, and leaving an open space, $a$, of about twelve inches wide, more or less, for the passage of the fish up and down the chute. The triangles C C are laid on two stringers, which extend up and down the chute, and the triangles are secured to said stringers by means of iron bolts or clamps. The triangles and bottom of the chute are to be paved with stone or other suitable material.

By means of this arrangement fish are enabled to pass up steams obstructed by dams or slight vertical falls, or natural vertical obstructions, when not too elevated.

In addition to this, it will be found that water running through a chute of this kind will have a tendency to keep crafts descending the chute in the center, and thus secure to them a safer passage in their descent. In the present chutes the force of water, confined in a narrow space, has a tendency to raise in the middle, and thus throw a raft or ark or other craft out of the center to one side or other, and sometimes obliquely across the chute. It also breaks the force of the water, and thus protects the bottom of the chutes, and will have a tendency to prevent them from bursting up or being washed out and forming breakers, so destructive to lumber-rafts and even the lives of watermen.

I am aware of the existence of Daniel Steck's patent of June 26, 1866, and do not claim anything contained therein; but—

What I do claim, and desire to secure by Letters Patent, is—

A series of isosceles or equilateral triangles, extending from the opposite side walls of the chute of a dam, and laid and secured in the bottom thereof, substantially in the manner and for the purposes herein set forth.

In testimony that I claim the foregoing as my own I affix my signature in the presence of two witnesses.

JAMES D. BREWER.

Witnesses:
WM. BRINDLE,
J. M. M. GERNERD.